No. 786,903. PATENTED APR. 11, 1905.
J. W. HYATT.
LINK AND CHAIN FOR JUICE EXTRACTING MACHINES.
APPLICATION FILED JULY 17, 1903. RENEWED SEPT. 10, 1904.

2 SHEETS—SHEET 1.

Attest:
L. Lee
D. Blake

Inventor.
John W. Hyatt, Jr.
Thomas S. Crane, Atty.

No. 786,903. PATENTED APR. 11, 1905.
J. W. HYATT.
LINK AND CHAIN FOR JUICE EXTRACTING MACHINES.
APPLICATION FILED JULY 17, 1903. RENEWED SEPT. 10, 1904.
2 SHEETS—SHEET 2.
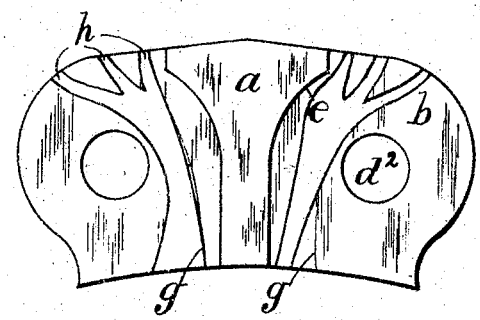
Fig. 4.
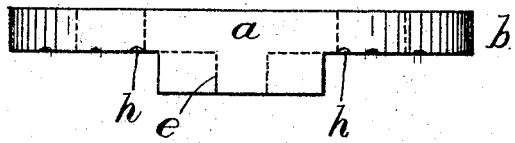
Fig. 5.
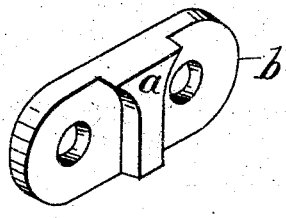
Fig. 6.
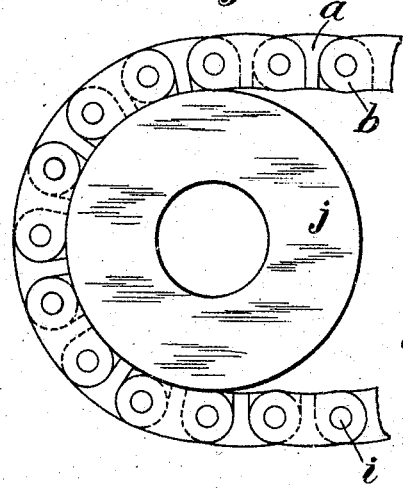
Fig. 9.
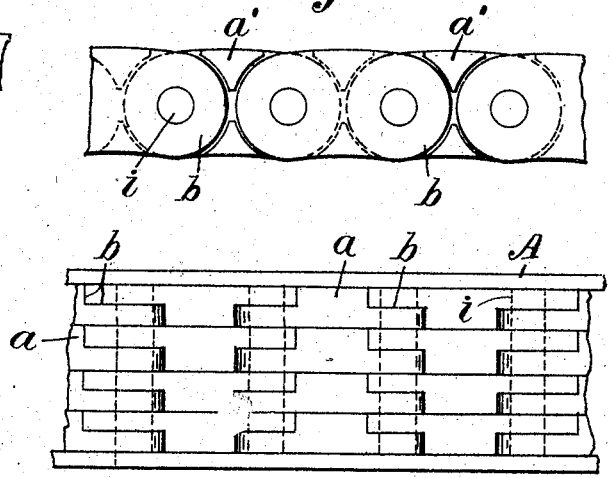
Fig. 8.
Fig. 7.
Attest:
L. Lee.
Arthur F. Heaton
Inventor.
John W. Hyatt, per
Thomas S. Crane, Atty.

No. 786,903. Patented April 11, 1905.

UNITED STATES PATENT OFFICE.

JOHN W. HYATT, OF NEWARK, NEW JERSEY.

LINK AND CHAIN FOR JUICE-EXTRACTING MACHINES.

SPECIFICATION forming part of Letters Patent No. 786,903, dated April 11, 1905.

Application filed July 17, 1903. Renewed September 10, 1904. Serial No. 224,026.

*To all whom it may concern:*

Be it known that I, JOHN W. HYATT, a citizen of the United States, and a resident of 141 Commerce street, Newark, county of Essex, State of New Jersey, have invented certain new and useful Improvements in Links and Chains for Juice-Extracting Machines, fully described and represented in the following specification and the accompanying drawings, forming a part of the same.

The object of the present invention is to furnish a chain which may offer substantially a continuous bearing-surface for material under pressure and when required may also furnish an outlet for the fluid expressed from the material. Such a chain is usually made of much greater breadth than thickness and propelled between parallel cheeks, which serve to confine the material and conduct it to the pressing agent, which may consist of another chain converged toward the first or of a suitable roll opposed to the surface of the chain. To secure a continuous bearing-surface upon the chain, I construct the same of rows of links, each having a continuous bearing-surface produced by half-laps at the ends of the links and a body intermediate to the ends of the same thickness as two of the half-laps. Where the chain is intended for a juice-extracting machine, the adjacent surfaces of the links may be grooved transversely to form passages for the escape of the liquid, and the contiguous faces of the half-laps may be similarly grooved. The intermediate portion of the body is recessed in a curve at the end which receives the contiguous half-lap, thus forming a semi-arch, which extends over the recess upon the outer side of the link to form a bearing-surface for the material between the link ends.

Figure 1:
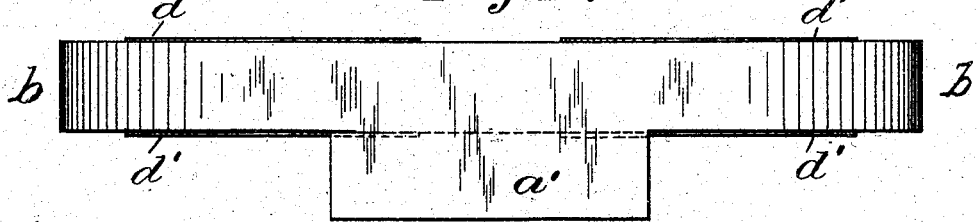
Figure 2:
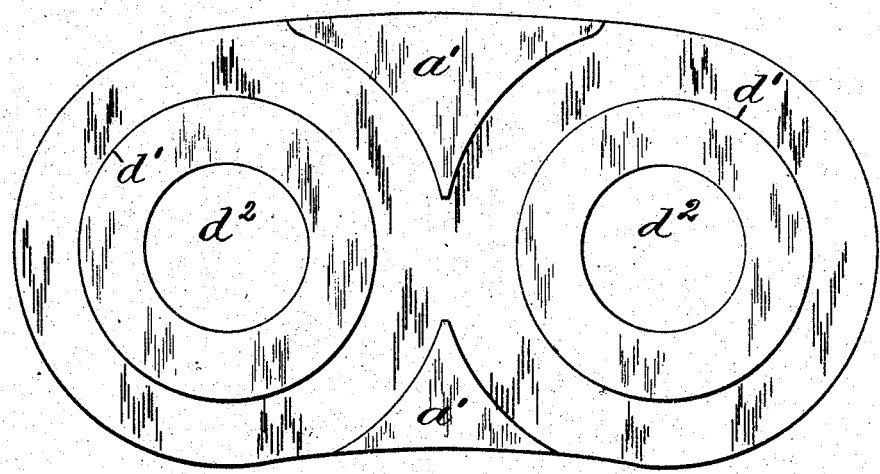
Figure 3:
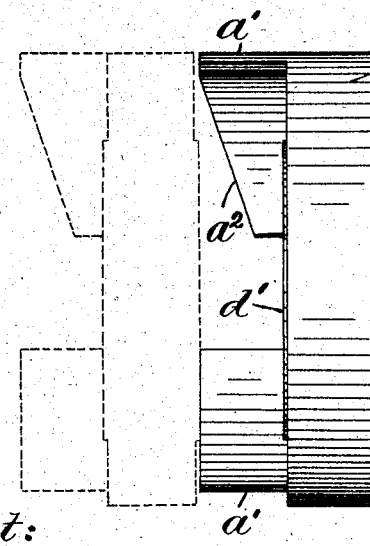

In the drawings, Figure 1 is a plan, and Fig. 2 a side view, of a link having the semi-arches disposed to form triangular portions upon the inner and outer side of the link. Fig. 3 is an end view of the link, showing the inner beveling of the triangular portion upon the outside of the link. Fig. 4 is a side view, and Fig. 5 an edge view, of a link having a straight tongue extended inwardly from the semi-arches. Fig. 6 is a perspective view of the same. Fig. 7 is a plan of a chain formed of the links shown either in Fig. 2 or Fig. 4. Fig. 8 is an edge view of such a chain formed with the links shown in Fig. 2, and Fig. 9 shows a chain looped around a driving-drum and formed with the link shown in Fig. 6.

In Figs. 1 to 3 the distance between the centers of the rivet-holes $d^2$ is the same as the width of the link, so that the flat ends of the links when coupled are contiguous to one another, and the body portion, which is twice as thick as the half-lapped portions $b$, is thus cut away into triangular projections $a'$. The link is shown concave upon the inner edge and convex upon the outer edge to fit upon a drum, as shown in Fig. 9, so as to have an extended bearing-surface upon the drum to sustain most firmly the heavy pressure imposed upon the chain in juice-extracting apparatus. The ends of the links are curved substantially concentric with the rivet-holes $d^2$, the half-arches upon the sides of the triangular projection $a'$ being correspondingly curved, and these projections extending to the edges of the link form a continuous bearing-surface for the material which rests upon the outer side of the link and a continuous bearing-surface for the portion of the link which is in contact with the drum. Annular seats $d'$ are shown extended around the rivet-holes to space the half-lapped portions a little apart from one another to facilitate the escape of juice from the material between the several links. To further facilitate such escape, the triangular projection $a'$ upon the outer edge of the link is beveled inwardly, as shown by the inclined surface $a^2$ in Fig. 3, which forms a clearance from the upper edge of the triangular portion upon which the compressed material rests and permits the juice to escape freely from such compressed material and also permits any fibers of material which crowd between the body portions of the links to escape from the outer surface. A chain formed of such links is represented in Fig. 8, and a chain belt formed of a succession of such chains is shown in Fig. 7, with rivet-bars at $i$ extended through the same. Cheeks A are shown adjacent to the edges of the chain belt in Fig. 7, between which the chain moves where subjected to the pressing influence, such cheeks serving where in contact with the chain to hold the several rows of links in their working position and where projected above the chain to prevent the material from crowding sidewise under pressure.

Figs. 4 to 6 and Fig. 9 show the projection upon the body portion, (lettered $a$,) of slightly different form from the projections shown in Fig. 2, the semi-arches uniting in a tongue which is extended straight down to the inner edge of the link. Such a tongue is admissible where the centers of the rivet-holes are farther apart than the width of the link, as it leaves a space between the ends of the adjacent half-laps $b$ for the tongue to project inwardly. Such tongue serves to rest upon the supporting-drum where the greatest pressure is experienced and directly sustains the semi-arched projection at the outer edge of the link which covers the rounded ends of the half-laps. The inner ends of the tongues in a chain formed of such links is shown in contact with the drum $j$ in Fig. 9. In Fig. 4 the inner faces of the half-laps are shown formed with a channel $g$ extended to the inner edge of the link, and branch channels $h$ extend therefrom to the outer edge of the link, by which any juice expressed upon the chain may escape to the inner side of the same, and thus avoid reabsorption by the compressed material.

With the links of the construction herein described a single chain may be formed by disposing one half the links with the projections at the right side and the other half with the projections at the left side, as shown in Fig. 8, and a chain belt is formed by uniting a series of such rows of links laterally by extending continuous rivets (equal in length to the width of the chain) through all of the holes in the same line across the belt.

It is important to furnish the chain belt with abundant clearance for the discharge of juice from the compressed material, so that the juice will not be reabsorbed after it has once been pressed out of the fibers, and such object is best attained by making the chain belt with numerous longitudinal rows of links between all of which interspaces exist for the discharge of the juice. It is also essential in such a chain belt that the links shall be strong enough edgewise to sustain very heavy pressure and that the round ends of the links shall be covered by arch-shaped projections upon the body portion, so as to form a practically continuous support for the material under pressure.

The link shown in Figs. 1 and 2 exhibits the preferred form of the invention, which I have claimed specifically herein.

It will be readily understood that accurate finish is not required upon a chain to support rough fibrous material like sugar-cane, and links may therefore be made by both casting and drop-forging of the shapes shown in the drawings and connected by rivets without any material amount of machine-work. Irregularities of the links when made by casting or drop-forging would produce crevices or interspaces between the links which would in some cases suffice to discharge the juice; but where required links may be made with the seats $d'$ one thirty-second of an inch or any other desired height to separate the adjacent faces and form the spaces required for the fluid to exude.

It is obvious that a permeable chain belt is especially adapted to run over horizontal rolls, so that the interspaces between the links will be vertical and the juice forced into the same may escape readily by the direct downward force of gravity; but the chain may also be used upon vertical rolls where desired.

The chain described herein is intended for operation in machines where a very great pressure is exerted upon the material and is therefore supported by a cylindrical roll at the point where the greatest pressure is applied, and to give an extended bearing upon such supporting-roller the inner edges of the links (which form the entire inner side of the chain) are concaved with the same radius as the roll upon which they are to be supported, and thus furnish an extended bearing for the links when running over the supporting-roller.

I am aware that a machinery-belt has been made of leather links with the ends compressed, so as to form a body of greater thickness than the ends; but such compression is not adapted to form the ends of the links just one-half the thickness of the body, as is required in the present invention, and such leather belt does not, therefore, furnish a continuous bearing-surface upon either side. This is an immaterial matter in a belt used for driving machinery, under which conditions it is not required to support a load of material under heavy pressure. In the present invention the ends of the connected links must be covered to prevent the material which is pressed upon the chain from being crowded in between the link ends, which would prevent the escape of juice and would clog the movements of the chain, so as to render the same inoperative. In the present invention the body portion is made precisely twice as thick as the half-lap portions, so that the arches $e$ upon such body portion cover the entire width of the contiguous end portions and prevent any access of the fibrous material between the ends of the links where it could become jammed. My construction also furnishes a continuous smooth edge upon the chain, so as to produce a close joint with the cheeks which confine the material, and this has not been effected in the construction of the machinery-belt to which I have referred.

I do not claim the mere compression of the link ends nor the making of the body portion thicker than such ends, except the body be made exactly twice the thickness of the half-lap portions, so as to wholly cover the ends of the connected links and form a smooth edge upon the chain to closely fit the cheeks of a juice-extractor machine.

Having thus set forth the nature of the invention, what I claim herein is—

1. A juice-extractor chain-link having at the ends half-lap portions, and at the middle a body twice as thick as the half-lap portions, such body having semi-arches the same width as the half-lap portions and adapted to extend over the ends of connected links and to cover their entire width upon the fiber-bearing side of the link.

2. A juice-extractor chain-link having at the ends half-lap portions, and at the middle a body twice as thick as the half-lap portions, such body having its inner edge concave to give an extended bearing upon a cylindrical roller, and having semi-arches the same width as the half-lap portions and adapted to extend over the ends of connected links and to cover their entire width upon the fiber-bearing side of the link.

3. A juice-extractor chain-link having at the ends half-lap portions provided with pivot-holes, and an intermediate body twice as thick as the ends projected wholly upon one side of the link, and arched concentric with the pivot-holes and adapted to wholly cover the ends of the connecting-links.

4. A juice-extractor chain-link having the centers for the pivots about the same distance apart as the width of the link, a body portion formed twice as thick as the half-lap portions and projected wholly upon one side of the link, and having arches upon opposite sides, dividing the projection upon the body into the triangular studs $a'$, as and for the purpose set forth.

5. A juice-extractor chain-link having half-laps at the ends, an intermediate body twice as thick as the ends projected wholly upon one side of the link, and beveled inwardly from the outer edge toward the inner edge of the link, to permit a free escape of the liquid between the links.

6. A juice-extractor chain composed of links having semicircular ends with rivet-holes at the centers of the ends, the longitudinal middle of each link having a projection upon one side equal to the thickness of the ends, and formed to fit the ends of the connected links, the whole united by rivets through the rivet-holes, forming a chain having a continuous surface at each edge.

7. A juice-extractor chain-link having at the ends half-laps formed with rivet-holes and rounded upon the ends concentric with such holes, an intermediate body twice as thick as the ends formed to cover the ends of contiguous links jointed thereto, and the half-laps having each a seat surrounding the rivet-hole to space the links apart, and a groove upon its face to permit the escape of liquid through the joint of the half-lap portions.

8. A chain for supporting fibrous material in juice extraction, such chain having a continuous supporting-surface for the material, and consisting of a series of adjacent rows of half-lap links all connected together laterally, the bodies of said links having twice the thickness of the end portions and such portions formed concavely to cover the adjacent ends of the connected links, the links having plain round holes in the ends and rivets extended through the holes in the contiguous links across the entire width of the chain.

9. A chain for supporting fibrous material in juice extraction, such chain having a continuous supporting-surface for the material, and consisting of a series of adjacent rows of half-lap links all connected together laterally, the bodies of said links having a projection at the middle of one side equal to the thickness of the half-lap portions, and having recesses fitted to the ends of the connected links to cover the whole of their width, the links having plain round holes in the ends and rivets extended through the holes in the contiguous links across the entire width of the chain.

10. A chain for supporting fibrous material in juice extraction, consisting of a series of adjacent rows of half-lap links all connected together laterally, the bodies of said links having the inner edge concave to give an extended bearing upon a cylindrical roller and formed on one side with a projection equal to the thickness of the half-lap portions, and such projection having recesses fitted to the ends of the contiguous links upon their inner and outer edges to form a continuous surface upon both sides of the chain, the links being united by rivets extended across the entire width of the chain, and the chain thus being adapted to furnish a continuous bearing for the material and to have a continuous bearing upon a supporting-roller.

In testimony whereof I have hereunto set my hand in the presence of two subscribing witnesses.

JOHN W. HYATT.

Witnesses:
L. LEE,
THOMAS S. CRANE.